Patented June 24, 1941

2,246,900

UNITED STATES PATENT OFFICE 2,246,900

CATALYTIC MATERIAL

Walter A. Schulze and Frederick E. Frey, Bartlesville, Okla., assignors to Phillips Petroleum Company, a corporation of Delaware No Drawing. Application January 27, 1937, Serial No. 122,660

12 Claims. (Cl. 252—241)

This invention relates to improvements in catalytic materials and more particularly relates to the treatment of solid contact catalysts of the adsorbent type with acids in the vapor form to increase and improve the activity of such catalysts.

It is well known that solid adsorbent materials of the clay type, for example the hydrosilicates, have been used to some extent for treating petroleum vapors to facilitate the polymerization of the highly unsaturated constituents which tend to form gum in motor fuels. It is known, too, that materials such as alumina have been used somewhat as dehydration catalysts. Also, bauxite and the like have been used as catalysts to facilitate the decomposition of the organic sulfur compounds which are exceedingly deleterious to the octane number and lead response of the various gasoline stocks used in blending for motor fuels.

It is an object of the present invention to provide improved catalysts for the aforementioned processes and for other purposes by treatment of the aluminum hydrosilicates which may contain other basic oxides chemically combined, also alumina, bauxite, brucite, and the like to greatly increase their activity and to prolong their life.

A further object of the invention is to provide a simple means of reactivating these adsorbent catalytic materials when they become spent due to the formation of inorganic sulfur compounds, carbonates, and the like, from impurities present in the vapors being treated.

We have found that the aforementioned adsorbent materials may be activated or otherwise modified by a simple treatment with certain acids in the gaseous state such as the hydrogen halides, hydrogen fluoride, hydrogen chloride and the like. These acids are passed in the vapor form over these solid adsorbent materials. These acid vapors may be diluted with inert gases, if desired, and/or they may be partially or completely saturated with water vapor at the temperature of treatment. In some cases, notably in treating the aluminum hydrosilicate, the activity is improved to an especially marked degree by subjecting the mineral to the action of a mixture of hydrofluoric and hydrochloric acid vapors or to the vapors, successively applied, of the individual acids.

Heretofore it has been suggested that dehydrated commercial alumina be treated with acid solutions to extract certain impurities such as iron, etc. In such an instance the alumina is immersed in a solution of the acid and let stand for 10 to 15 hours. Afterwards the acid is drained off and the alumina is washed with water to remove the soluble iron salts, etc. Such a process and procedure is far different from that of the present invention which proposes treatment of adsorbent catalysts with acids in the vapor form and not as a solution.

In more specific terms this invention contemplates increasing the activity of aluminum oxide and clay-like minerals by merely etching the surfaces of these substances by contacting with acid vapors for a short period of time and, preferably, at more or less elevated temperature but usually below 500° C. The physical and chemical structures of the substance are radically changed in this operation; hence the increased activity for catalytic purposes.

As an illustration of the invention, several specific examples are given below. However, since the number of examples could be multiplied greatly, the ones given here are merely illustrative and in no sense limit the invention.

Example I

A slow stream of hydrochloric acid gas is passed over bauxite at a temperature of about 200° C. and a pressure of about 10 pounds above atmospheric for a period of 30 minutes. The flow of hydrochloric acid gas is then discontinued and an inert gas is passed over the bauxite while the temperature is gradually increased to about 350° C. During this operation traces of aluminum chloride are sublimed and/or removed from the bauxite. The bauxite may then be used as a catalyst in desulfurizing and improving the antiknock characteristics of gasoline stocks in the vapor form. A marked increase in activity of the bauxite catalyst and in increased length of life will be noted.

Example II

Hydrofluoric acid gas is passed over 30 to 60 mesh (to the inch) fuller's earth at a pressure of about 5 pounds above atmospheric for a period of about one hour. Any adsorbed hydrogen fluoride or gas formed in the reaction is then removed by sweeping out with an inert gas. The treated fuller's earth is especially effective as a polymerizing catalyst for unsaturated hydrocarbons.

Example III

Hydrogen chloride gas diluted with hydrogen and water vapor is passed over brucite at a temperature above 50° C. for a period of about three hours. During this treatment the carbonates present in the brucite are decomposed and carbon dioxide is eliminated. If sulfides are present, as is always the case if the brucite has been used to treat sulfur-bearing hydrocarbons, such sulfides will be broken up and sulfur acids will be given off. An inert gas is passed over the brucite when the hydrogen chloride treatment has been completed, such inert gas sweeping out adsorbed hydrogen chloride and/or gases formed during the treatment. The treated brucite has greatly increased activity as a contact catalyst for treating hydrocarbons.

*Example IV*

Bauxite catalyst spent in the treatment of hydrocarbon vapors to reduce the sulfur content and improve the antiknock characteristics of the gasoline produced therefrom was first burned in an oxidizing atmosphere to remove the carbonaceous residues. Subsequent to this treatment, humidified hydrogen chloride vapors were passed over the bauxite to etch the surface and to decompose any carbonates and the like formed prior to and/or during the burning operation. Following this treatment the catalyst was found to have considerably increased activity for the purpose already mentioned.

It has been found that this treatment with acid vapors may be carried out at atmospheric pressure or at either higher or lower pressures, but in general pressures somewhat above atmospheric give the best results. This is probably due to more complete penetration of the particles by the acid vapors.

The removal of traces of the acid vapors and/or decomposed impurities subsequent to the treatment of the catalytic materials may be done by sweeping out with an inert gas and/or by reducing the pressure or employing vacuum and/or by raising the temperature. In some instances, of course, these traces of acid vapors will not interfere in the catalytic processes and hence do not need to be removed.

These activated catalysts when poisoned by carbonaceous residues, such as result from their use in catalytically treating hydrocarbons, may be regenerated indefinitely by heat treatment with air or an oxidizing gas and may be given further treatment with acid vapors as frequently as desired.

It has been found that materials of the hydrosilicate type are especially susceptible to the treatment with the hydrogen fluoride vapors, whereas those of the aluminum oxide type are in general more susceptible to the treatment with hydrogen chloride vapors. Either, however, may be used to give increased activity.

In addition to hydrogen fluoride and hydrogen chloride, other readily vaporizable acids which in the form of vapor are more or less effective are the organic acids such as acetic, formic, etc. Certain oxides such as nitrogen dioxide and nitric acid may sometimes be used to advantage, the most effective acid in a given case being readily determined by trial.

It is obvious to those skilled in the art that various changes may be made in the procedure of activating adsorbent catalytic materials with acid vapors as described without departing from the scope of the invention as defined in the appended claims.

We claim as our invention:

1. A process for increasing the catalytic activity of an adsorbent mineral material of the clay type selected from the group consisting of aluminum hydrosilicates, bauxite and brucite, which comprises contacting said material with a hydrogen halide selected from the group consisting of hydrogen fluoride and hydrogen chloride in the gaseous state and in the substantial absence of liquid water at a temperature within the range of 200 to 500° C. for a substantial period of time not greater than about one hour, and interrupting the stream of hydrogen halide and contacting said material with a stream of inert gas for a period of time sufficient to remove adsorbed hydrogen halide and volatile reaction products thereof.

2. A process for restoring the activity of solid adsorbent mineral catalyst masses of the clay type used in promoting the catalytic conversion of hydrocarbon fluids, which comprises burning said masses in an oxidizing atmosphere to remove carbonaceous residues, then contacting said masses with a stream of a gaseous hydrogen halide selected from the group consisting of hydrogen fluoride and hydrogen chloride at a temperature within the range of 200 to 500° C. for a period of time not greater than about one hour, and interrupting the stream of hydrogen halide and contacting said masses with a stream of inert gas for a period of time sufficient to remove adsorbed hydrogen halide and volatile reaction products thereof.

3. The process of claim 2 wherein the catalyst mass of the clay type is an adsorbent mineral of the clay type selected from the group consisting of aluminum hydrosilicates, bauxite, and brucite.

4. A process for activating adsorbent mineral catalysts of the clay type which comprises contacting said material with a gaseous mixture of hydrogen fluoride, hydrogen chloride and an inert gas and in the substantial absence of liquid water at temperatures within the range of 200 to 500° C. and superatmospheric pressure for a period of about 30 minutes, interrupting the stream of hydrogen halides while continuing the stream of inert gas for a period of time sufficient to remove adsorbed hydrogen halides and volatile reaction products thereof.

5. A process for activating an adsorbent mineral catalyst of the clay type, which comprises slowly passing a stream of hydrogen fluoride and hydrogen chloride in a gaseous state and in the substantial absence of liquid water, at an elevated temperature at least sufficient to insure the absence of water and below 500° C., in contact with a body of said adsorbent for a period of time sufficient to activate said adsorbent, interrupting the halide stream, and contacting said adsorbent with a stream of inert gas for a period of time sufficient to remove adsorbed hydrogen halide and volatile reaction products thereof.

6. A process for restoring the activity of solid adsorbent mineral catalyst masses of the clay type used in the refining of hydrocarbon fluids which comprises burning said masses in air to remove carbonaceous residues, then contacting with a gaseous mixture comprising hydrogen fluoride and hydrogen chloride at temperatures within the range of 200 to 500° C. for a period of about 30 minutes, interrupting the stream of halides and contacting said masses with a stream of inert gas, thereby removing adsorbed halides and volatile reaction products thereof.

7. A process for activating adsorbent mineral catalysts of the clay type which comprises passing a stream of gaseous hydrogen fluoride mixed with an inert gas and in the substantial absence of liquid water at temperatures within the range of 200 to 500° C. in contact with a body of said adsorbent for a period of time sufficient to activate said adsorbent, interrupting the stream of hydrogen fluoride while continuing the stream of inert gas whereby adsorbed hydrogen fluoride and volatile reaction products thereof are removed from the activated adsorbent mineral.

8. A process for restoring the activity of solid adsorbent mineral catalyst masses of the clay type used in promoting the catalytic conversion of hydrocarbon fluids which comprises burning said masses in air to remove carbonaceous residues, then contacting with a stream of gaseous hydrogen fluoride at temperatures within the range of 200 to 500° C. for a period of about 30 minutes, interrupting the stream of halide and contacting said masses with a stream of inert gas, thereby removing adsorbed hydrogen fluoride and volatile reaction products thereof.

9. A process for activating adsorbent mineral catalysts of the clay type which comprises slowly passing a stream of hydrogen fluoride in a gaseous state and in the substantial absence of liquid water at an elevated temperature at least sufficient to insure the absence of water in the liquid phase below 500° C., in contact with a body of said absorbent for a period of time sufficient to activate said adsorbent, interrupting the halide stream, and contacting said adsorbent with a stream of inert gas for a period of time sufficient to remove adsorbed hydrogen fluoride and volatile reaction products thereof.

10. A process for increasing the catalytic activity of an adsorbent mineral material of the clay type which comprises contacting said material with hydrogen fluoride, in the gaseous state and in the substantial absence of liquid water, at a temperature within the range of 200° to 500° C. and superatmospheric pressure, for a period of about thirty minutes, and then contacting said adsorbent material with a stream of inert gas for a period of time sufficient to remove adsorbed hydrogen fluoride and volatile reaction products thereof.

11. A process for increasing the catalytic activity of bauxite, comprising contacting bauxite with hydrochloric acid gas at a temperature in the range of 200° to 500° C. and superatmospheric pressure for a period of about 30 minutes.

12. A process for increasing the catalytic activity of an adsorbent mineral material of the clay type which comprises contacting said material with a hydrogen halide of the group consisting of hydrogen chloride and hydrogen fluoride, in the gaseous state and in the substantial absence of liquid water, at a temperature within the range of 200° to 500° C. and superatmospheric pressure, for a period of about thirty minutes, and then contacting said adsorbent material with a stream of inert gas for a period of time sufficient to remove adsorbed hydrogen halide and volatile reaction products thereof.

WALTER A. SCHULZE.
FREDERICK E. FREY.